Dec. 31, 1968 D. MICHON 3,419,846
METHOD FOR CUTTING OUT STRAY SIGNALS
Filed May 22, 1967
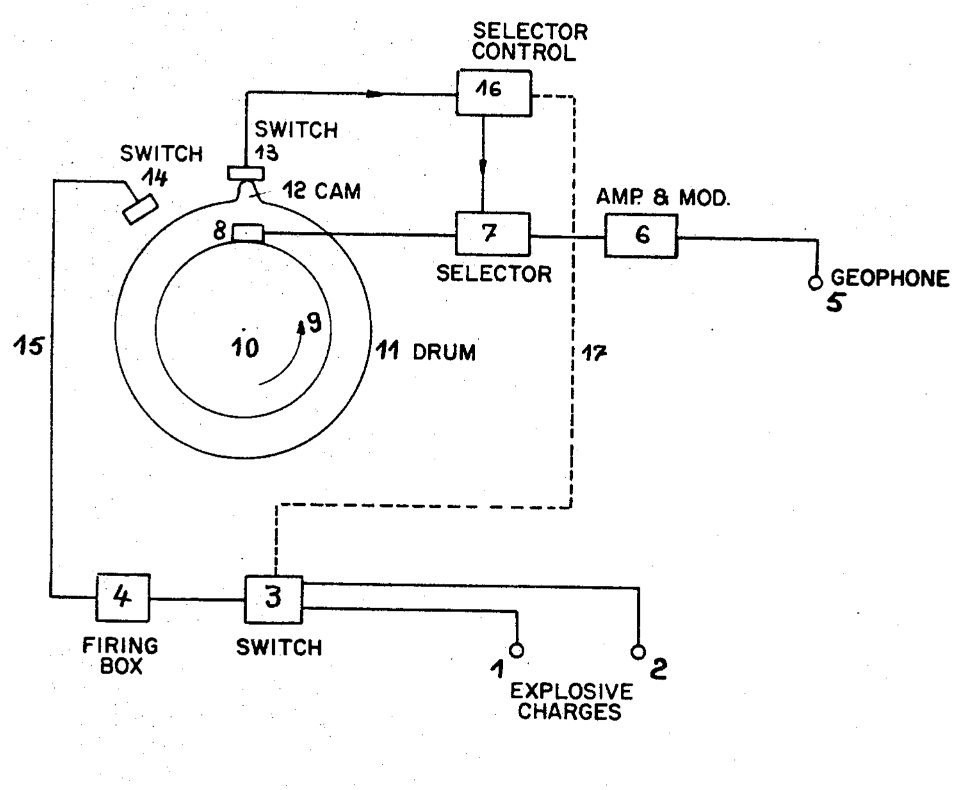

United States Patent Office 3,419,846
Patented Dec. 31, 1968

3,419,846
METHOD FOR CUTTING OUT STRAY SIGNALS

Dominique Michon, Paris, France, assignor to Compagnie Generale de Geophysique, Paris, France
Filed May 22, 1967, Ser. No. 640,133
Claims priority, application France, May 20, 1966, 62,223
8 Claims. (Cl. 340—15.5)

ABSTRACT OF THE DISCLOSURE

A method for cutting out strays of a substantially constant amplitude and frequency such as those produced by the mains out of the compound record formed by adding the records of similar signals produced in sequence at uniform intervals chiefly for seismic purposes, said method consisting in shifting the beginning of each record by a value $K/f+1/Nf$ wherein K is an integer, $f$ the frequency of the strays and N the number of records. The addition of N records wipes out the sum of the N sinusoidal stray voltages thus phase-shifted by $2\pi/N$ corresponding to said fraction $1/Nf$.

The present invention relates to a method for cutting out the stray signals appearing when recording a sequence of similar repeated signals.

Said method is applicable in all cases where the strays are constituted by waves of an unvarying known frequency and of an amplitude which is substantially constant during operation.

The invention will be disclosed in further detail relative to its application to the recording of seismic signals. However, as disclosed hereinafter, it is applicable to other recording methods having the same features and the present invention covers such obviously similar cases.

As well-known in the art, it is possible to take several times in succession the record of signals received by geophones and due to disturbances produced in succession under practically identical conditions from one operation to the next. For instance, it is possible to lay on the ground a number of explosive charges at points comparatively near one another when compared with the distance separating the firing points from the points at which the geophone or geophones are located, which supply the single signal to be recorded, said geophone or geophones grouped in series or in parallel being diagrammatized in the present specification as a single geophone supplying a single signal at a given moment.

The first explosive charge fired produces a first signal which lasts for a predetermined time T after which the operation is begun over again with a second charge and so on. Thus, at the end of the operation, a number of records are obtained and these records are then added so as to form a compound record constituting the result of the different operations.

Said procedure will now be disclosed, reference being made to the single figure of the accompanying drawing wherein 1 and 2 designate the extreme explosive charges, the intermediate charges not being illustrated for sake of clarity. Each of said charges is connected with a switch 3 the position of which allows firing selectively the charge 1 or the next charge and so on up to the extreme charge 2, said firing being effected by the firing box 4 connected with the switch 3. There are N charges thus arranged on the ground before operation.

5 designates the geophone or geophones supplying a single signal at a predetermined moment, said signal feeding the means 6 forming an amplifier and modulator. The output signal of 6 is sent through a selector 7 into one of N magnetic recording heads one of which is illustrated at 8. Underneath said heads arranged in sequence in a direction perpendicular to the plane of the drawing a magnetic tape carried by a drum 9 rotating on its axis 10 is caused to move.

Preferably, the rotation of the drum controls each of the firing operations and for this purpose a disc 11 keyed to the drum includes a projecting cam 12 which controls the selector 7 through the agency of a switch 13 engaged by said cam and of a control member 16 acting on the selector 7 in a manner such that for each rotation of the disc 11, the member 16 causes the selector 7 to progress by one step so as to connect the output of the amplifying and modulating means 6 with the next following magnetic head. Furthermore, the cam 12 acts on a second switch 14 controlling the moment of firing through the firing box 4 as provided by the connection 15.

In practice, the number N is generally selected as equal to 10 so that the switch 3 and selector 7 may assume each ten different positions.

The operation is as follows:

The drum 9 being started, when the cam 12 engages the switch 14, the charge 1 is fired and this leads to a recording of signals from the geophone 5 during one revolution of the drum. Slightly before the end of said revolution, the cam 12 acts on the switch 13 so as to make the selector 7 progress by one step and connect the next magnetic head. After a short time, the cam 12 engages again the switch 14 and in the meantime the switch 3 has been shifted forwardly by one step, either by hand or automatically under the control of the switch 13 and member 16 and of the connection 17 drawn in interrupted lines. This further engagement with the switch 13 results in an explosion of a further charge and the operation begins over again, a further signal being recorded adjacent the preceding signal since the following head 8 is now connected with the geophone 5 and so on.

At the end of these successive operations, N records or tracks have thus been recorded on the magnetic tape carried by the drum 9; said records are then read by reading heads and the output voltages of said heads are added for instance so as to produce a compound record which is that to be used by the operator.

In other cases, instead of explosive charges a mechanical arrangement is resorted to which for each order transmitted by the switch 14 sends into the ground a seismic shock the starting moment of which is well-defined. The present invention is also applicable to such cases.

It is a known fact that geophones record not only the useful voltages produced by the vibrations released purposely in the ground, but also parasitic voltages of any origin due for instance to micro-seisms, wind and the like.

Now applicant has found that said parasitic signals include very often stable sinusoidal signals the amplitudes of which are practically constant during the recording operations executed as disclosed hereinabove on the N different tracks.

The present invention has for its object a particular method for operating with the apparatus described so as to remove all such parasitic signals of an unvarying frequency $f$. Experience shows that such a cutting out leads to a great improvement in the prospecting operations carried out in the manner disclosed hereinabove. The invention relies on the following facts, well-known per se: the addition of N sinusoidal voltages of the same amplitude and phase—shifted with reference to one another by an angle equal to $2\pi/N$ produces a resultant equal to zero.

Consequently, the invention consists in executing the records in a manner such that the beginning of one record may be shifted with reference to the beginning of the preceding record by a period T given out by the formula $$T=\frac{K}{f}+\frac{I}{Nf}$$

K being an integer and N the number of records executed.

In the embodiment disclosed, it is sufficient with a view to obtaining said result to adjust accurately the speed of rotation of the drum 9 in a manner such that the duration of each revolution of said drum may be exactly equal to the value T defined by the above formula.

It is found in practice that in many cases the parasitic signals have a frequency which is exactly equal to that of the electric mains feeding the area in which the prospection is being performed. This is by no means surprising, since the electric and magnetic fields produced by the power feeders of the mains and the stray currents ascribable to said mains and flowing through the ground produce in the geophone and the cable connected with the latter parasitic voltages of a same period and amplitude, which are practically unvarying throughout a comparatively long time.

The above formula can be easily explained: the first term $f$ corresponds to an integral number of periods of the stray voltage, whereas the term $1/Nf$ corresponds to the angular shifting by $2\pi/N$ of any record with reference to the preceding record and to the following record. For instance, in the case where $N=10$ and $f=50$ cycles/sec. that is the frequency of the distributing mains considered, the term $1/Nf$ is equal to $2/1000$ of a second and experience shows that it is possible to release a recording operation with a suitable accuracy corresponding to said frequency. It is thus possible to take for instance $K=600$, which leads to $T=12$ sec.$+2/1000$ of a second$=12.002$ seconds. It is an easy matter to define with such an accuracy the rotary speed of the drum in order to obtain the desired result. It is essential to remark that the moment at which the firing begins does not interfere with the compensation of the parasitic signals and even if the moment of each firing is shifted by say $1/100$ of a second with reference to the theoretical moment, this has no action as concerns the cutting out of the strays.

It will also be remarked that the improved method according to the invention allows also cutting out the parasitic signals to a substantial, if not theoretically complete, extent in the case where the amplitude of the parasitic signals considered varies during operation.

Of course, each of the N records obtained in the manner disclosed is influenced by the parasitic signals, but in the compound record which is the sum of the N elementary records, the influence of the strays is cut out.

What I claim is:

1. A method comprising recording N signals during a sequence of uniform time intervals, and compounding the thusly recorded signals into one composite signal, said N signals being recorded in such a manner as to eliminate from said composite signal parasitic waves of substantially constant amplitude and frequency by shifting the beginning of each of the recordings of said N signals relative to the preceding recording by a period $K/f+1/Nf$ wherein $f$ is the frequency of said parasitic signal and K is an integer.

2. A method as claimed in claim 1 wherein each of the N signals is magnetically recorded in a discrete area of a magnetic recording medium.

3. A method as claimed in claim 1, wherein said signals are formed in accordance with the structural characteristics of a mass and said mass is subjected to the electromagnetic effects of an electrical power supply, said frequency being that of said power supply.

4. A method as claimed in claim 1, wherein said signals are seismically generated by modulating a carrier by the results of sequential explosions whose shock waves are transmitted through a mass being examined.

5. A method as claimed in claim 4, wherein said explosions are synchronized with said sequence of time intervals.

6. Apparatus comprising signal means to generate a carrier signal, seismic means to generate a sequence of N seismic signals, modulating means to modulate said carrier in accordance with said seismic signals, record means to record each of the thusly modulated signals, the thusly recorded signals having parasitic components of a substantially constant frequency $f$ and of a substantially constant amplitude, and control means to offset the recordings by a time shift equal to $K/f+1/Nf$ wherein K is an integer.

7. Apparatus as claimed in claim 6, wherein said record means includes a magnet drum and a recording head movable axially along said drum and wherein said control means includes means to control the rotational speed of the drum.

8. Apparatus as claimed in claim 7, wherein said control means includes means rotating with said drum and including means to step the recording head axially along the drum after each complete rotation of the latter.

References Cited

UNITED STATES PATENTS

| | | | |
|---|---|---|---|
| 2,438,217 | 3/1948 | Johnson | 340—15.5 |
| 2,450,352 | 9/1948 | Piety | 340—15.5 |

RODNEY D. BENNETT, *Primary Examiner.*

D. C. KAUFMAN, *Assistant Examiner.*

U.S. Cl. X.R.

181—.5; 328—165